Patented Apr. 11, 1950

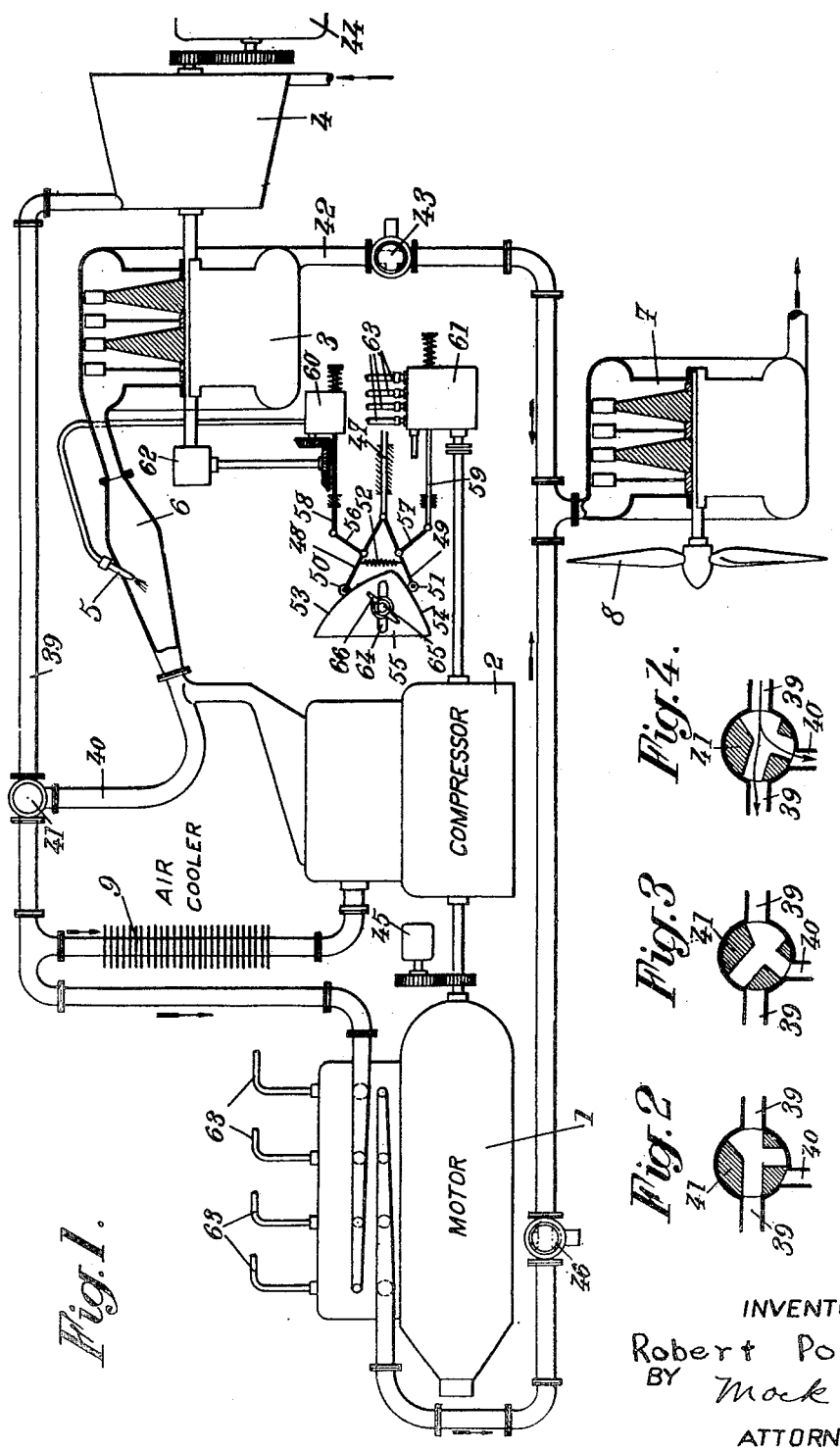

2,503,410

UNITED STATES PATENT OFFICE 2,503,410

MOTOR-COMPRESSOR POWER PLANT, INCLUDING A TURBINE-COMPRESSOR GROUP AND A RECEIVER

Robert Pouit, Lyon, France, assignor to Societe Industrielle Generale de Mecanique Appliquee (S. I. G. M. A.), Villeurbanne, France, a society of France Application October 26, 1948, Serial No. 56,597
In France April 21, 1948

5 Claims. (Cl. 60—41)

The present invention relates to power plants, and more especially, although not exclusively, power plants for use on flying machines of the type comprising on the one hand a motor-compressor group including a motor element and a compressor element mechanically driven by said motor element and, on the other hand, a turbo-compressor group including a turbine operated by at least a portion of the output of said compressor element, after passage thereof through a combustion chamber, and a blower mechanically driven by said turbine and the output of which is supplied to both said motor and said compressor elements for supercharging them, the exhausts of both said motor element and said turbine serving to operate a fluid driven energy receiver. Power plants of this kind are described in my U. S. patent application Ser. No. 788,935 filed November 29, 1947.

The chief object of my invention is to provide a plant of this type which is better adapted to meet the various requirements of practice than the existing ones, in particular concerning starting and regulation.

It consists chiefly in connecting, in particular for starting purposes, the exhaust conduit of the blower element of the turbo-blower of the plant with the inlet of the combustion chamber provided on the upstream side of the turbine element of the turbo-blower through a by-pass conduit which short-circuits the compressor element of the motor-compressor group, control means being provided to permit of opening or closing this by-pass conduit and establishing or cutting off the communication between said exhaust conduit and the compressor and motor elements of the motor-compressor group.

A second feature of my invention relates to the regulation of the amounts of fuel introduced, on the one hand into the above mentioned combustion chamber and, on the other hand, into the motor element of the motor-compressor group, and this feature consists in actuating, at least for certain conditions of operation of the plant, from a single control part, the means for regulating the amounts of fuel introduced, on the one hand into said combustion chamber, and, on the other hand into said motor element, so as thus to maintain predetermined ratios, between these two amounts of fuel, for the various positions of said single control part.

A preferred embodiment of my invention will be hereinafter described with reference to the accompanying drawing, given merely by way of example and in which:

Fig. 1 diagrammatically shows a plant made according to my invention;

Figs. 2, 3 and 4 show a three way control valve, in sectional view, in three different working positions.

The power plant shown by the drawing includes the following elements:

On the one hand, a motor compressor group including a motor element 1 of the piston type and a compressor element 2, for instance also of the piston type, compressor element 2 being mechanically driven by motor element 1;

On the other hand, a turbo-blower group including a gas turbine element 3 and a rotary compressor 4, the turbine element 3 being supplied with air from the compressor element 2 of the motor-compressor, into which air a certain amount of fuel is injected through a nozzle 5 into a combustion chamber 6 interposed between compressor 2 and turbine 3 and in which said fuel burns; and Finally, a receiver device, preferably constituted by at least one gas turbine 7 driving, for instance, a propeller 8 and supplied with the gases that flow out, after partial expansion, from the motor element 1 of the motor-compressor and from the turbine 3 of the turbo-blower. It should be noted that the compressed air and the motor gases flow along the above indicated paths only after the plant is started.

The motor-compressor includes a multi-cylinder engine of the connecting rod and crankshaft type which drives, through its shaft, compressor 2, which may be a piston compressor. As a rule, it will be advantageous to interpose cooling means 9 in the conduit that conveys a portion of the air compressed by blower 4 toward the compressor element 2 of the motor-compressor. Furthermore, the exhaust gases from the turbine element 3 of the turbo-blower are preferably given substantially the same pressure as those from the motor element 1 of the motor-compressor, whereby it is possible to mix together these two streams of exhaust gases before introducing them into the device provided for receiving these gases, for instance turbine 7.

If the exhaust gases from motor element 1 and turbine element 3 had different pressures, these two streams might be introduced either into two different receiving turbines or, preferably, into two different stages of the same turbine.

In order to facilitate starting of the plant above described, I connect, according to the main feature of my invention, the delivery conduit 39 of blower 4, through a by-pass conduit 40, directly with the inlet of combustion chamber 6, this bypass conduit thus short-circuiting radiator 9 and the compressor element 2 of the motor-compressor group. Furthermore, I provide, in delivery conduit 39, at the place where conduit 40 branches off, a control part 41, preferably in the form of a three-way cock capable of assuming three positions:

A first one (Fig. 2) in which this cock closes conduit 40 and permits the flow of the air delivered by blower 4 toward the motor 1 and the compressor 2 of the motor-compressor group;

A second one, shown by Fig. 3, in which cock 41 connects the delivery conduit 39 of the blower with the by-pass conduit 40 and cuts off conduit 39 from the motor-compressor group and A third one, shown by Fig. 4, in which the cock connects delivery conduit 39 both with the by-pass conduit 40 and with the motor-compressor group.

Finally, I provide on the downstream side of turbine 3, in the exhaust conduit 42 thereof, a valve 43 adapted to permit of connecting the exhaust conduit 42 of turbine 3 with the atmosphere.

When it is desired to start the plant shown by Fig. 1, cock 41 is placed in the position of Fig. 3 and cock 43 in the position in which it connects exhaust conduit 42 with the atmosphere. Turbo-blower 3—4 is then started by means of an auxiliary motor, for instance an electric motor 44 which, once starting has taken place, can be disconnected. When cock 41 is in said position, the whole of turbine 3, blower 4 and combustion chamber 6 constitutes an ordinary gas turbine arrangement. The air supplied by blower 4 is fed to turbine 3 after it has been heated by combustion of the fuel injected through injector 5 into combustion chamber 6.

This air expands in turbine 3, driving the latter, and finally escapes through valve 43 into the atmosphere.

The gas turbine system 3—4—6 thus started very quickly reaches conditions in which its rotary movement to be accelerated is self-maintained. When the delivery pressure of blower 4 has become sufficient, cock 41 is given the position shown by Fig. 4 in which a portion of the air delivered by blower 4 can pass into the motor-compressor group whereas another portion of this air keeps flowing through by-pass conduit 40 to reach combustion chamber 6 directly.

The engine 1 of the motor-compressor group is then started, for instance by means of a motor 45, preferably after having operated a cock 46 inserted in the exhaust conduit of motor 1, so as to permit exhaust of the combustion gases from this motor into the atmosphere.

When motor 1 is being started, compressor 2 is running idle. This way of working is automatically obtained when compressor 2 is fitted with automatic valves, in view of the fact that the pressures on the upstream and downstream sides of this motor-compressor are equal. If compressor 2 is fitted with a mechanically controlled valve gear, it is necessary to act in a suitable manner on this control so as also to have compressor 2 running idle. In this way, motor 1, once started, very quickly assumes normal running conditions. When these conditions have been reached, cock 41 is brought into the position shown by Fig. 2, in which the by-pass conduit 40 is cut off, and the whole of the air supplied by blower 4 is fed to the motor-compressor 1, 2, and valves 43 and 46 are closed, so that the exhaust gases from motor 1 and turbine 3 now serve to supply turbine 7, which is started. The starting period is now finished and the whole of the plant begins to run normally.

Concerning the regulation of a plant such as that illustrated by Fig. 1, it can be obtained through correlative variation of the amount of fuel burned in the cylinders of motor 1 and the amount of fuel burned in combustion chamber 6.

Variation of the amount of fuel burned in this last mentioned chamber involves a variation of the power of turbo-blower 3—4, that is to say a variation of the pressure and of the flow rate of the supercharging air, which has an essential repercussion upon the operation of the motor of the motor-compressor group. For a good operation of the plant under various loads, it is further necessary to regulate, in a suitable manner, the ratio of the weight of air flowing through motor 1 to that flowing through the compressor 2 of the motor-compressor group, and this, in particular, in order to ensure a suitable scavenging of the motor. This involves the necessity of observing a predetermined correlation between the energies supplied by motor 1 and turbine 3.

This is why, according to a second feature of my invention which may, eventually, be used separately, I connect with a single control part on the one hand the means for determining the amount of fuel introduced into motor 1, and on the other hand the means for determining the amount of fuel introduced into combustion chamber 6, so as thus to maintain a predetermined ratio between the two amounts of fuel for the various positions of said single control part.

This regulating device may obviously be made in many ways.

According to an advantageous embodiment, I use, as single control part, a rod 47 slidable axially. One of the ends of the rod 47 is connected to two links 48 and 49 the free ends of which, provided with rollers 50, 51, are applied by the pull of a spring 52 against inclined surfaces 53, 54 of a cam 55 which is normally fixed. Furthermore, at points located between the ends of links 48, 49, are mounted other links 56, 57 the free ends of which are connected to the regulating rods 58, 59 of two injection pumps 60 and 61, one of which, driven for instance from turbine 3, through a speed multiplying gear 62, supplies fuel to the injector 5 of combustion chamber 6, whereas the other one 61, which is preferably a polycylindric pump, supplies fuel through several conduits 63 to the respective cylinders of motor 1, this last mentioned pump being driven by this last mentioned motor.

If the inclined surfaces 53 and 54 of cam 55 are given suitable shapes, an axial sliding of control part 47 moves regulating rods 58 and 59 in such manner that, for every position of rod 47, the amounts of fuel respectively supplied by pumps 60 and 61 are in predetermined ratios which depend upon the shape of the inclined surfaces of cam 55.

If it is desired to vary the regulation law ensured by cam 55, the position of this cam, which is normally fixed, may be modified.

For this purpose, I may provide, in cam 55, a slot 64 through which is engaged a pin 65 rigid with the frame of the plant. I may vary the position of the cam either by a movement in the direction of the axis of said slot, or by a rotation about pin 65. The cam can be fixed in the desired position by means of a tightening nut 66.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A power plant which comprises, in combination, a motor-compressor group including a motor element and a compressor element mechanically driven by said motor element, a turbo-blower group including a gas turbine element and a blower element mechanically driven by said turbine, means for feeding at least a portion of the output of said compressor element to the intake of said turbine, said means including a combustion chamber interposed between said compressor element and said turbine, means for injecting and burning fuel in this chamber, means for supercharging said motor and compressor elements in parallel from the output of said blower, a gas driven energy receiver having its intake connected with the exhausts of both said motor element and said turbine, a by-pass conduit interposed between the output end of said blower and the inlet of said combustion chamber and control means for opening or closing said bypass conduit.

2. A power plant which comprises, in combination, a motor-compressor group including a motor element and a compressor element mechanically driven by said motor element, a turbo-blower group including a gas turbine element and a blower element mechanically driven by said turbine, means for feeding at least a portion of the output of said compressor element to the intake of said turbine, said means including a combustion chamber interposed between said compressor element and said turbine, means for injecting and burning fuel in this chamber, means for supercharging said motor and compressor elements in parallel from the output of said blower, a gas driven energy receiver having its intake connected with the exhausts of both said motor element and said turbine, a by-pass conduit interposed between the output end of said blower and the inlet of said combustion chamber, control means for opening or closing said by-pass conduit and valve means inserted directly between the exhaust of said turbine and the atmosphere.

3. A power plant according to claim 2, further comprising valve means inserted direct between the exhaust of said motor element and the atmosphere.

4. A power plant which comprises, in combination, a motor-compressor group including a motor element and a compressor element mechanically driven by said motor element, a turbo- blower group including a gas turbine element and a blower element mechanically driven by said turbine, means for feeding at least a portion of the output of said compressor element to the intake of said turbine, said means including a combustion chamber interposed between said compressor element and said turbine, means for injecting and burning fuel in this chamber, means for supercharging said motor and compressor elements in parallel from the output of said blower, a gas driven energy receiver having its intake connected with the exhausts of both said motor element and said turbine, a by-pass conduit interposed between the output end of said blower and the inlet of said combustion chamber, control means for opening or closing said by-pass conduit, means for determining the rate of feed of fuel to said motor element and means for determining the rate of feed of fuel to said combustion chamber, said two last mentioned means being operatively interconnected to maintain a predetermined law of interrelation between said two respective rates of feed.

5. A power plant which comprises, in combination, a motor-compressor group including a motor element and a compressor element mechanically driven by said motor element, a turbo-blower group including a gas turbine element and a blower element mechanically driven by said turbine, means for feeding at least a portion of the output of said compressor element to the intake of said turbine, said means including a combustion chamber interposed between said compressor element and said turbine, means for injecting and burning fuel in this chamber, means for supercharging said motor and compressor elements in parallel from the output of said blower, a gas driven energy receiver having its intake connected with the exhausts of both said motor element and said turbine, a by-pass conduit interposed between the output end of said blower and the inlet of said combustion chamber, control means for opening or closing said by-pass conduit, means for determining the rate of feed of fuel to said motor element, means for determining the rate of feed of fuel to said combustion chamber, and a common control part for operating said two last mentioned means to maintain a predetermined law of interrelation between said two respective rates of feed.

ROBERT POUIT.

REFERENCES CITED

The following references are of record in the file of this patent:

FOREIGN PATENTS

| Number | Country | Date |
|---|---|---|
| 583,727 | Great Britain | Dec. 30, 1946 |